US012013715B2

(12) United States Patent
Wung

(10) Patent No.: US 12,013,715 B2
(45) Date of Patent: Jun. 18, 2024

(54) FOOT PEDAL SWITCH STRUCTURE

(71) Applicant: E SEW CO., LTD., Taichung (TW)

(72) Inventor: Denny Wung, Taichung (TW)

(73) Assignee: E Sew Co., Ltd., Taichung (TW)

( * ) Notice: Subject to any disclaimer, the term of this patent is extended or adjusted under 35 U.S.C. 154(b) by 0 days.

(21) Appl. No.: 18/057,509

(22) Filed: Nov. 21, 2022

(65) Prior Publication Data

US 2024/0143015 A1 May 2, 2024

(30) Foreign Application Priority Data

Oct. 28, 2022 (TW) ................................. 111211814

(51) Int. Cl.
*G05G 1/60* (2008.04)
*G05G 1/44* (2008.04)
*G05G 1/483* (2008.04)

(52) U.S. Cl.
CPC ................. *G05G 1/60* (2013.01); *G05G 1/44* (2013.01); *G05G 1/483* (2013.01)

(58) Field of Classification Search
CPC ............ G05G 1/60; G05G 1/44; G05G 1/483; G05G 1/48; D05B 69/18; D05B 69/06; A61C 1/0023; H01H 3/14
See application file for complete search history.

(56) References Cited

U.S. PATENT DOCUMENTS 1,027,702 A * 5/1912 Durand .................. G05G 1/405 74/513
1,218,047 A * 3/1917 Bill .......................... G05G 1/60 74/564
3,353,424 A * 11/1967 Peterson ................ H01C 10/14 200/86.5
3,667,316 A * 6/1972 Valletti .................... G05G 1/60 74/560
10,626,536 B2 * 4/2020 Hanada .................. D05B 69/08

* cited by examiner

*Primary Examiner* — Thomas C Diaz
(74) *Attorney, Agent, or Firm* — Rosenberg, Klein & Lee

(57) ABSTRACT

The present invention relates to a foot pedal switch structure for reducing foot fatigue caused by pressing the foot pedal switch that comprises a body, a pedal, and a support pad. The body has a holding space; a pivot shaft is located in each left and right outer side in the rear area thereof separately; and the rear bottom side of the body has a joint unit. The pedal has a pivot hole located in each left and right side separately, wherein the pivot holes are placed over the pivot shafts of the body; the pedal is placed over and covers the holding space of the body. The support pad has a connecting plate extended therefrom, wherein the connecting plate is connected with the joint unit of the body.

10 Claims, 11 Drawing Sheets

FOOT PEDAL SWITCH STRUCTURE

BACKGROUND OF THE INVENTION

1. Fields of the Invention

The present invention relates to the technology of mechanical switches, especially, a foot pedal switch structure for reducing foot fatigue.

2. Descriptions of Related Art

Please refer to FIG. 10. A foot switch 9 of the prior art is widely used as a mean of controlling mechanical operations in the textile industry, CNC, medical instruments, or printing instruments. Using the stepping or pressing motion by foot to turn on or off the electrical circuit is suitable for operational environments when operations by hand need to be free from or replaced. For example, in the textile industry, operators need to hold and move the fabric by hand to keep pace with the movement of the sewing needle. The operator operates the foot switch 9 of the prior art, using his/her heel as a supporting point behind the pedal 91 of the foot switch 9 of the prior art while having the front part of the foot held up above the pedal 91, and steps on the pedal 91 to turn on the electrical circuit that sets off the machine to function.

Please refer to FIG. 11. The operator steps on the foot switch 9 of the prior art while standing or sitting down. After a long period of time of flexing the ankle, the tibial nerve compression may lead to a numb feeling. When the operator's foot becomes numb, errors in operation can easily happen resulting in damage in products that will be scraped off. Furthermore, the foot switch 9 or the prior art will easily move and slide during operation. Therefore, improvements of the prior art are inevitably needed.

Therefore, in view of the aforementioned problems of the foot switches of the prior art, the inventor of the present invention searched intensively for the solutions and developed the foot pedal switch structure of the present invention. The main objective of the present invention is to provide a foot pedal switch structure for reducing foot fatigue; the secondary objective of the present invention is to provide a foot pedal switch structure that is not easily displaced from the designated position.

SUMMARY OF THE INVENTION

The present invention relates to a foot pedal switch structure that comprises a body, a pedal, and a support pad. The body has a holding space; a pivot shaft is located in each left and right outer side in the rear area thereof separately; the rear bottom side of the body has a joint unit. The pedal has a pivot hole located in each left and right side separately, wherein the pivot holes are placed over the pivot shafts of the body; the pedal is placed over and covers the holding space of the body. The support pad has a connecting plate extended therefrom, wherein the connecting plate is connected with the joint unit of the body.

The aforementioned body further comprises a control switch, a push-pull device, a torque spring, and a spring. The control switch, the torque spring, and the spring are installed in the holding space of the body; one end of the spring is connected to the body whereas the other end of the spring is installed to the pedal. The push-pull device is installed in the sliding groove located in the body. The torque spring is connected to both the push-pull device and the control switch at the same time.

The aforementioned body has an embedded recess and a mounting piece, wherein the embedded recess is located at the bottom of the body and the mounting piece is lodged in the embedded recess.

The aforementioned pedal further comprises a protruding unit and the protruding unit is corresponding to the push-pull device of the body.

The joint unit of the aforementioned body has a recess unit and the recess unit has a plurality of mounting bosses.

The connecting plate of the aforementioned support pad has a plurality of through holes wherein the plurality of through holes are corresponding to and sleeved on the plurality of mounting bosses located in the recess unit. The connecting plate is fixed onto the mounting bosses through a plurality of screws that rotate through the connecting plate.

The aforementioned support pad can further have two flanges, wherein these two flanges are installed on to the surface of both sides of the support pad separately and the two flanges located in each left and right side separately thereof have a mounting hole separately.

The surface or/and the bottom surface of the aforementioned pedal has/have a non-slip unit separately; the surface or/and the bottom surface of the support pad has a non-slip unit separately. The body has a through hole and the through hole is located on the side of the body, wherein a power cord passes through the through hole and is electrically connected with the control switch.

The aforementioned body has a width and a first length, wherein the ratio of the width and the first length is 4:7. The support pad has a second length, wherein the ratio of the width and the second length is 16:7.

The aforementioned body further has a retaining base and an adjusting screw, wherein the retaining base has a bent tab on each left and right side separately; these two bent tabs are locked to both sides of the body separately. The rear area of the retaining base has a positioning plate, wherein the adjusting screw passes through the positioning plate and is fastened into an adjusting hole of the support pad.

The present invention applies the aforementioned technical means to achieve the following effects:

1. The present invention provides the means for the operator's heel to rest on and supporting the heel through the support pad setting, while the forefoot is in contact with the pedal. The present invention can maintain the calf and the forefoot at a more natural and ergonomic angle in order to reduce the burden to the ankle while the foot is kept at a tilt angle.
2. The present invention invents a design having a joint unit of the body connected with the connecting plate of the support pad thus to move around together. Meanwhile, the flanges of the support pad can be fixed to the floor or the base plate of the machine to prevent displacement of the foot pedal switch.

The present invention will become more fully understood from the detailed description given herein below for illustration only which thus does not limit the present invention.

BRIEF DESCRIPTION OF THE DRAWINGS

FIG. 11 is a schematic diagram of a foot switch of the prior art when displacement occurs as being stepped on.

DETAILED DESCRIPTION OF THE PREFERRED EMBODIMENT

Figure 1:
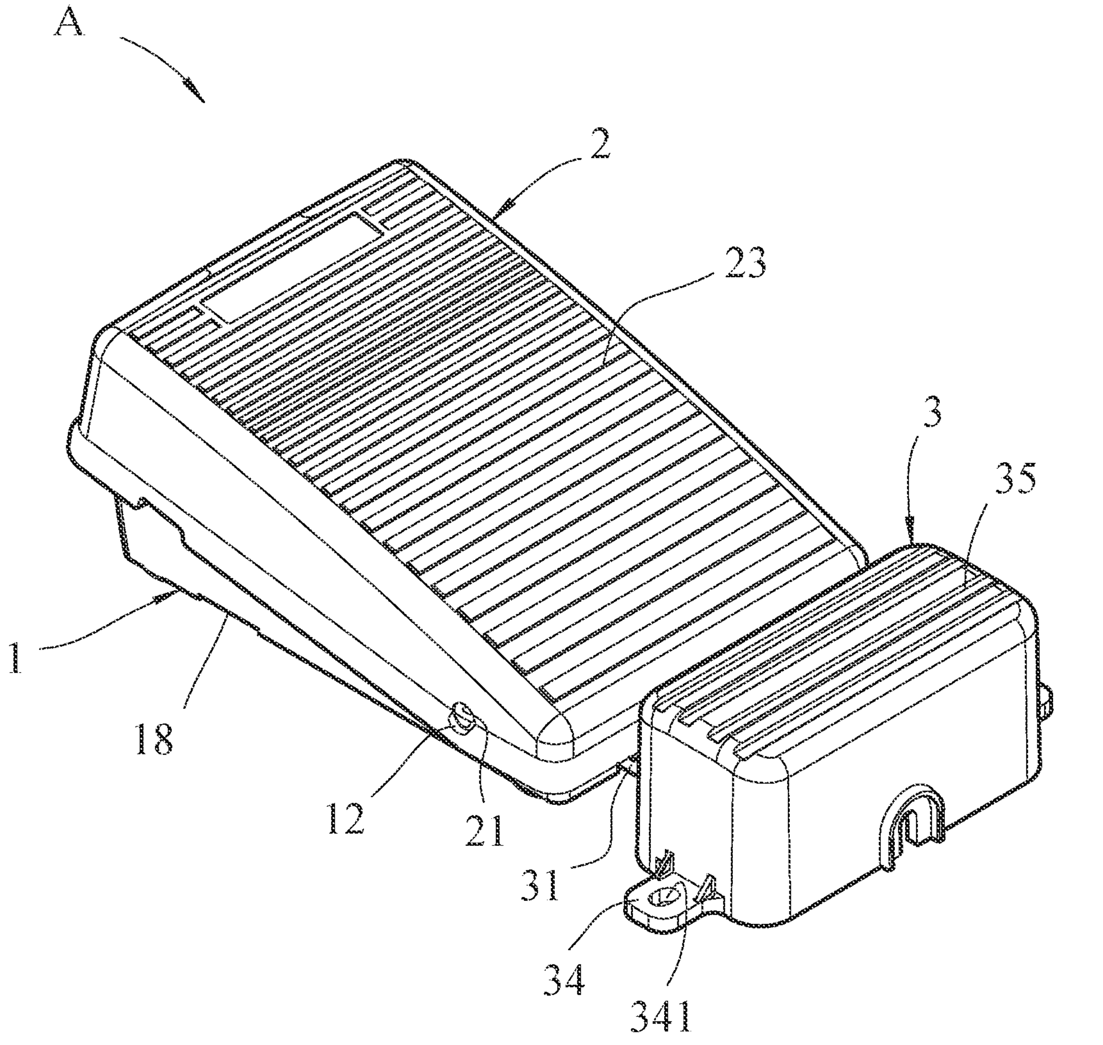
FIG. 1 is a three-dimensional external view of the foot pedal switch structure of the present invention.

Please refer to FIG. 1. The present invention relates to a foot pedal switch structure A for reducing foot fatigue caused by pressing the foot pedal switch that comprises a body 1, a pedal 2, and a support pad 3. The following descriptions together with figures are provided to explain how the aforementioned components are structured.

Figure 2:
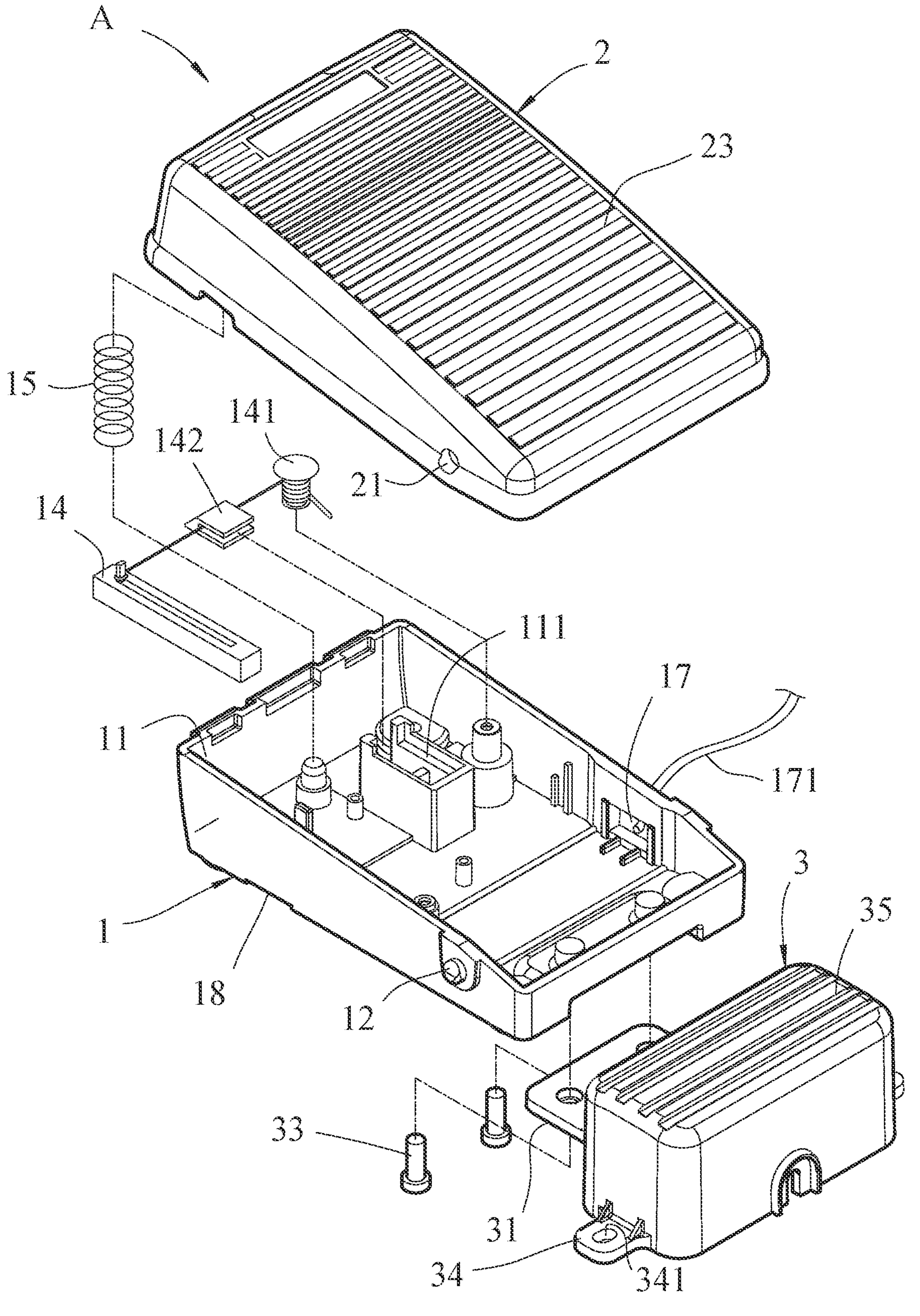
FIG. 2 is a three-dimensional exploded view of the foot pedal switch structure of the present invention.
Figure 3:
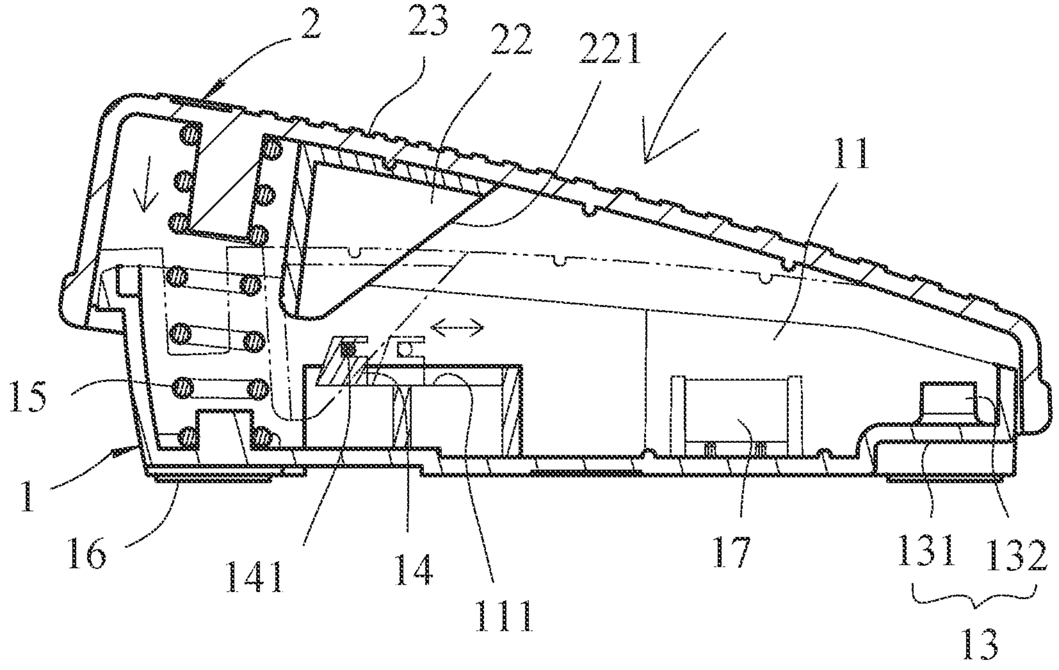
FIG. 3 is a sectional schematic diagram of the linkage relationship between the body and the pedal of the present invention.
Figure 4:
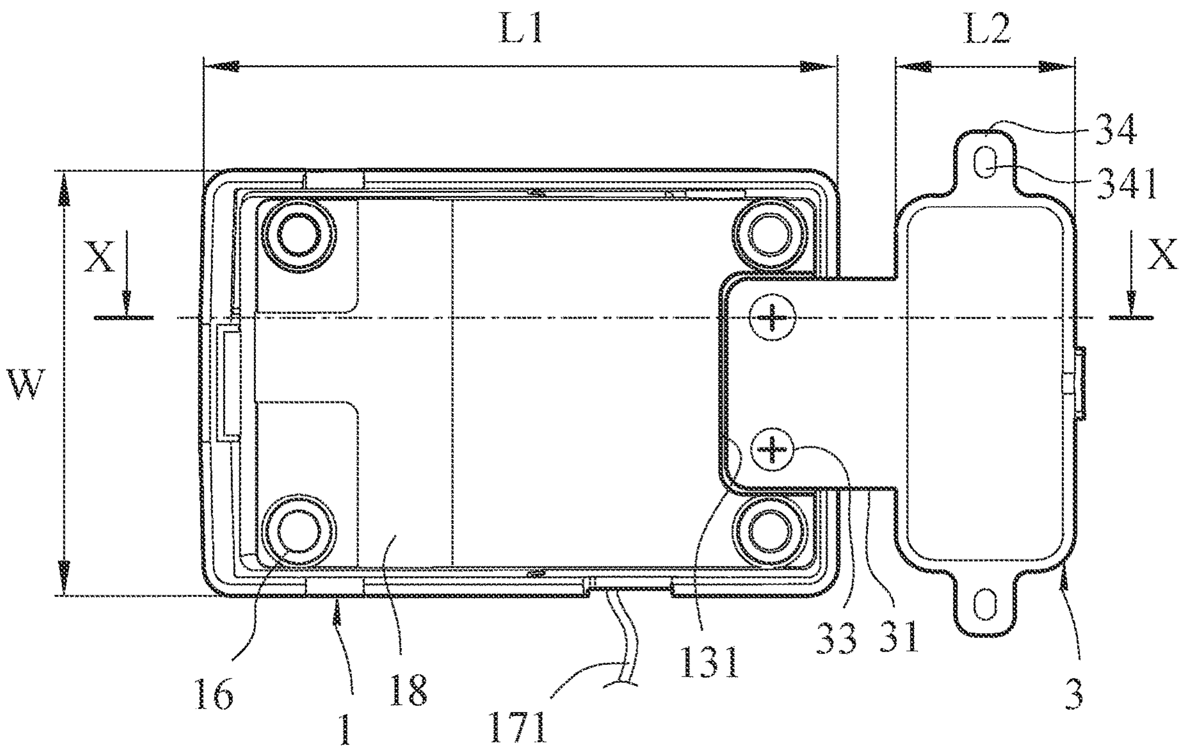
FIG. 4 is a bottom view of the foot pedal switch structure of the present invention.

Please refer to FIG. 2 to FIG. 4. The aforementioned body 1 is a U-shape thin case that comprises a holding space 11, a control switch 14, a torque spring 141, a push-pull device 142, a spring 15, four base pads 16, a through hole 17, an embedded recess 18, and a mounting piece 181. The torque spring 141 is connected to both the push-pull device 142 and the control switch 14 at the same time. The push-pull device 142 is installed in the sliding groove 111 located in the body 1. The spring 15 is installed in the holding space 11 of the body 1; one end of the spring 15 is connected to the body 1 whereas the other end of the spring 15 is installed to the pedal 2. A pivot shaft 12 is located in each left and right outer side in the rear area of the body 1 separately; the rear bottom side of the body 1 has a joint unit 13. The joint unit 13 has a recess unit 131 and the recess unit 131has a plurality of mounting bosses 132, wherein the mounting boss 132 has internal screw threads. Four base pads 16 are installed on the bottom of the body 1; these four base pads 16 provide holding means of the present invention to the ground firmly. Furthermore, the body 1 has a through hole 17 located on the side thereof, wherein a power cord 171 passes through the through hole 17 into the holding space 11 and is electrically connected with the control switch 14. To control the mechanical operation precisely, there is a T-shape embedded recess 18 located at the bottom of the body 1. Please refer to FIG. 7. The mounting piece 181 is lodged in the embedded recess 18 through a screw 182; the embedded recess 18 has a mounting hole 183 in each left and right side thereof separately.

Figure 8:
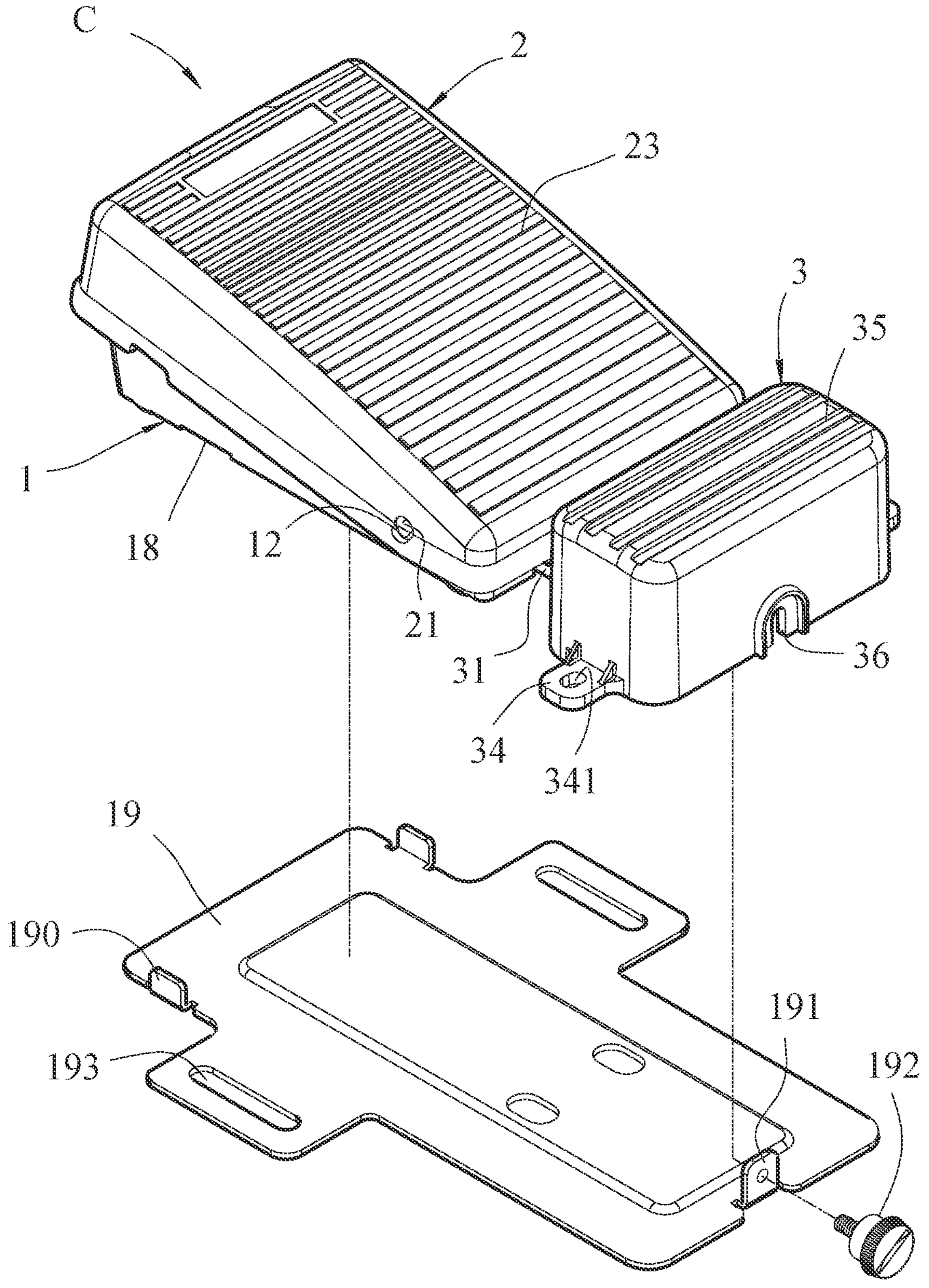
FIG. 8 is a three-dimensional exploded view of further another embodiment of the foot pedal switch structure of the present invention.

Please refer to FIG. 8. The body 1 further has a retaining base 19 and an adjusting screw 192, wherein the retaining base 19 has a bent tab 190 on each left and right side separately; these two bent tabs 190 are locked to both sides of the body 1. The rear area of the retaining base 19 has a positioning plate 191, wherein the adjusting screw 192 passes through the positioning plate 191 and is fastened into the adjusting hole 36 of the support pad 3.

Please refer to FIG. 2 and FIG. 3. The aforementioned pedal 2 has two pivot holes 21 and a protruding unit 22, wherein the pedal 2 has a pivot hole 21 located in each left and right side separately; the pivot holes correspond and are placed over the pivot shafts 12 of the body 1. The pedal 2 is placed over and covers the holding space 11 of the body 1; the surface or/and the bottom surface of the pedal 2 has/have a non-slip unit 23 separately.

Figure 5:
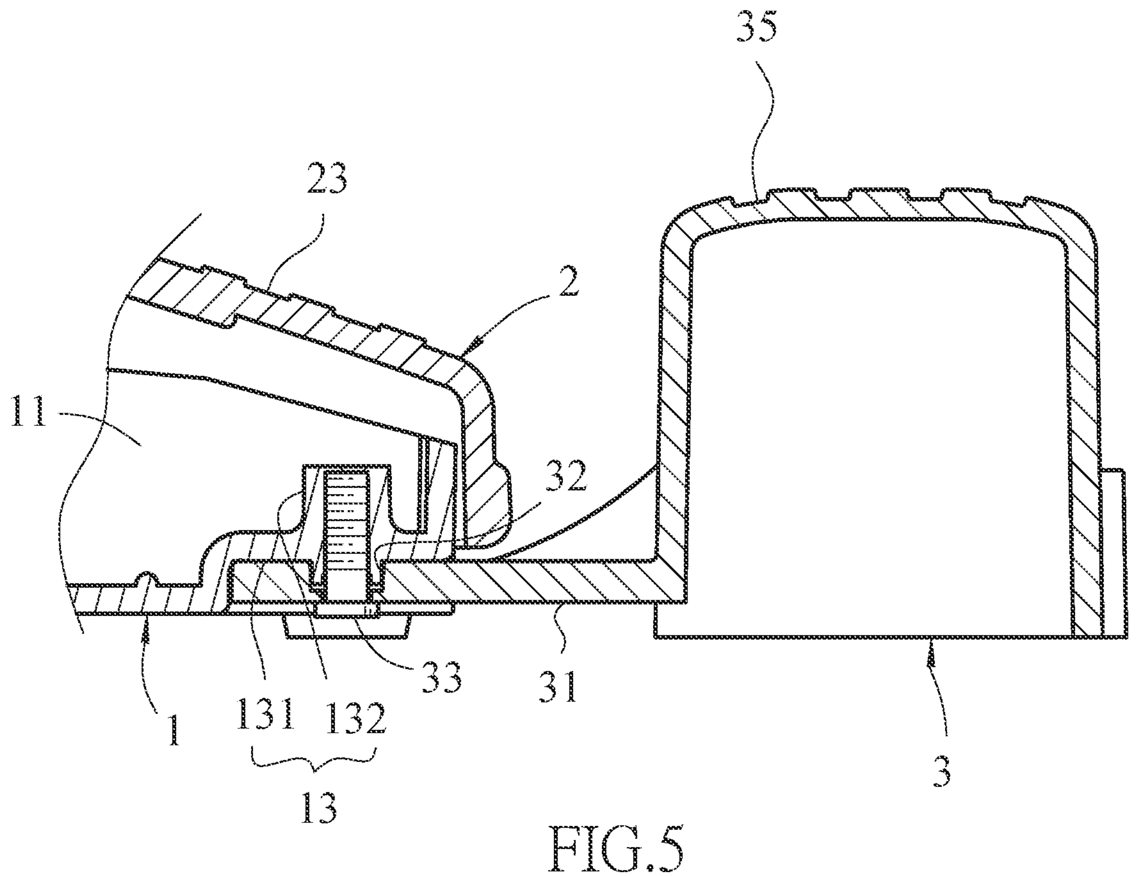
FIG. 5 is a sectional view along the cutting line X-X of FIG. 4 of the present invention.

Please refer to FIG. 2, FIG. 4, and FIG. 5. The aforementioned support pad 3 is a hollow thin case and has a connecting plate 31 extended from the bottom edge thereof, wherein the connecting plate 31 is connected with the joint unit 13 of the body 1. The connecting plate 31 has a plurality of through holes 32, wherein the plurality of through holes 32 are corresponding to and sleeved on the plurality of mounting bosses 132 of the joint unit 13; the connecting plate 31 is fixed onto the mounting bosses 132 of the body 1 through a plurality of screws 33 that rotate through the connecting plate 31. Further, the support pad 3 has two flanges 34 and a non-slip unit 35, wherein the two flanges 34 are installed on to the surface of both sides of the support pad 3 separately and both two flanges 34 have a mounting hole 341 thereof separately. The surface or/and the bottom surface of the support pad 3 has/have a non-slip unit 35 separately to increase the friction in order to prevent skidding while being stepped on.

Please refer to FIG. 4. The body 1 has a width W and a first length L1, wherein the ratio of the width W and the first length L1 is 4:7; the width W is set to be 70 mm to 90 mm and the first length L1 is set to be 130 mm to 150 mm. The preferred embodiment of the present invention has a width W of 8 mm and a first length L1 of 140 mm. The support pad 3 has a second length L2, wherein the ratio of the width W and the second length L2 is 16:7; the second length L2 is set to be 25 mm to 45 mm. The preferred embodiment of the present invention has a second length L2 of 35 mm.

Figure 6:
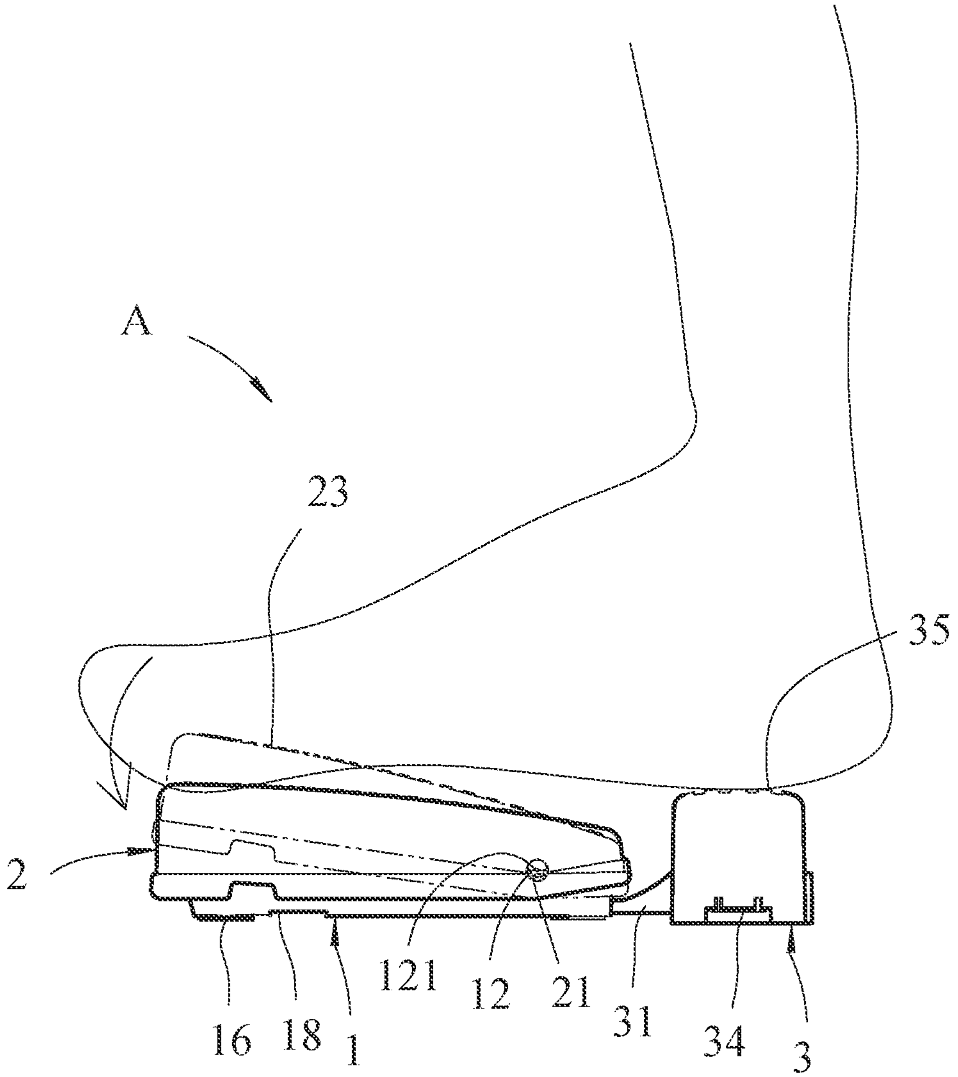
FIG. 6 is a schematic diagram of the foot pedal switch structure of the present invention performed by foot operation.

Please refer to FIG. 2, FIG. 3, and FIG. 6. A preferred embodiment of the foot pedal switch structure A of the present invention sets the pivot holes 21 of the pedal 2 to sleeve on the pivot shafts 12 of the body 1 to form a center 121. One end of the spring 15 is connected to the body 1 whereas the other end of the spring 15 is installed to the pedal 2. The through hole 17 has a power cord 171 passing therethrough to the holding space 11 and the power cord 171 is electrically connected with the control switch 14 in order to control the mechanical operation through pressing the pedal 2.

Please refer to FIG. 2 and FIG. 3. When the pedal 2 is pressed downward, the spring 15 is compressed. The push-pull device 142 is corresponding to the protruding unit 22 of the pedal 2; the protruding unit 22 compresses the push-pull device 142 by means of a inclined surface 221, forcing the push-pull device 142 to move along the sliding groove 111 while making the control switch 14 to slide rightward. At the same time, the torque spring 141 is compressed reversely. The control switch 14 can control the speed of the mechanical movement by measuring the scale of displacement in terms of adjusting the speed in non-segment based approach. After the pedal 2 is released, the compressed spring 15 will rebound and push the pedal 2 to restore its initial position. Meanwhile, the torque spring 141 rebounds and pushes the push-pull device 142 to move along the sliding groove 111, together with the control switch 14, leftward back to the initial stationary state.

Please refer to FIG. 4 and FIG. 5. The connecting plate 31 of the support pad 3 is aligned with the recess unit 131 of the body 1; a plurality of through holes 32 are corresponding to and sleeved on the plurality of mounting bosses 132, wherein the connecting plate 31 is fixed through a plurality of screws 33 that rotate therethrough. In the preferred embodiment of the present invention, there are two through holes 32, two mounting bosses 132, and two screws 33.

Please refer to FIG. 5 and FIG. 6. The foot of the operator rests on the pedal 2. During the operation, the operator positions his/her heel as the supporting point and steps on the pedal 2. At that point, the pedal 2 rolls downward around the center 121. The present invention provides the means for the operator's heel to maintain the position of stepping down the body 1 through the support pad 3 thus to reduce the fatigue or tibial nerve compression problems to the ankle while the foot is kept at a tilt angle for a long period time. Please refer to FIG. 4. The support pad 3 has two flanges 34, wherein the mounting holes 341 of these two flanges 34 are fixed to the floor or the base plate of the machine.

Figure 7:
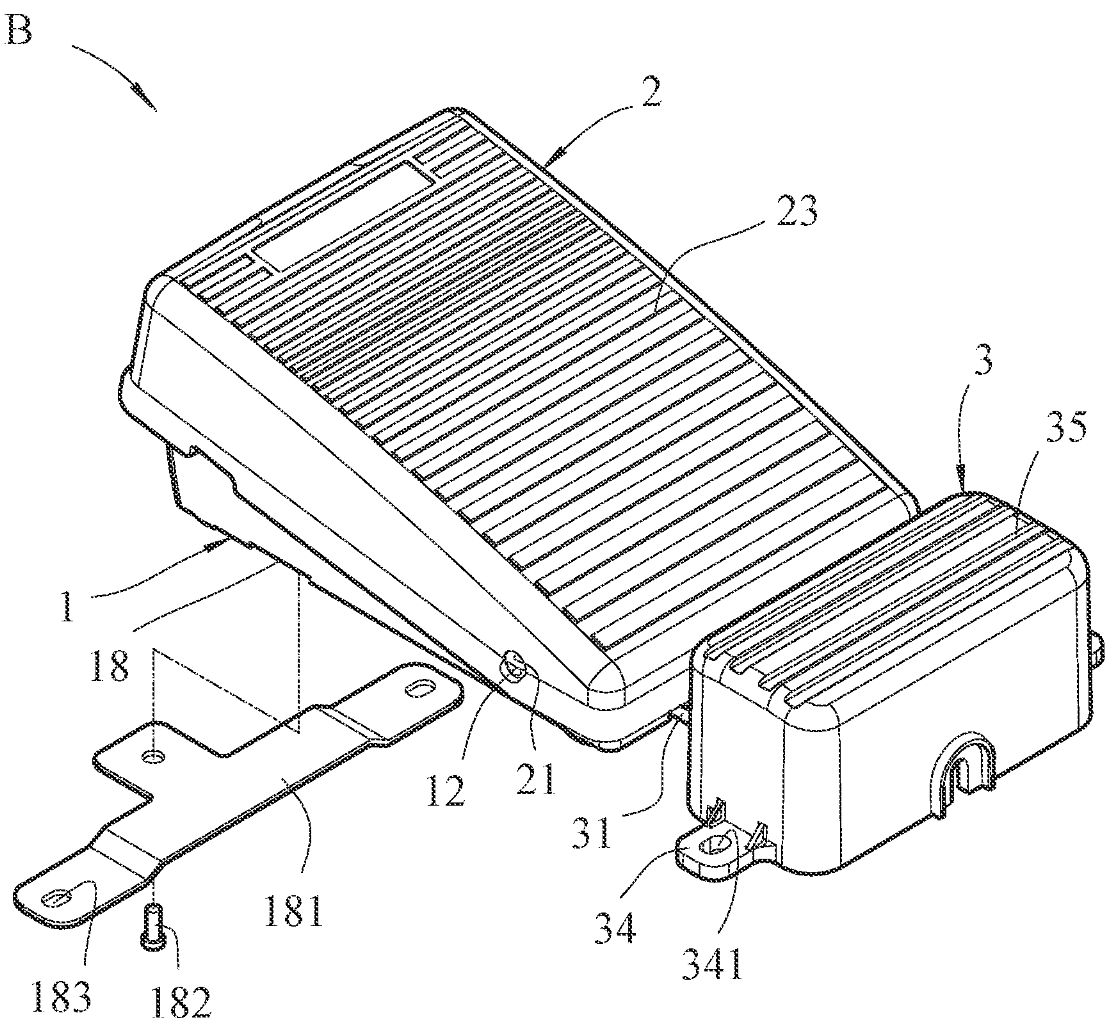
FIG. 7 is a three-dimensional exploded view of another embodiment of the foot pedal switch structure of the present invention.

Furthermore, please refer to FIG. 7. In another embodiment of a foot pedal switch structure B of the present invention, the mounting piece 181 can be fastened and fixed to the embedded recess 18 through the screw 182, wherein the mounting holes 183 of the mounting piece 181 can be fixed to the floor or the machine at the same time. Therefore, the two flanges 34 and the mounting piece 181 are fastened to any surface at the same time to secure the foot pedal switch structure B.

Figure 9:
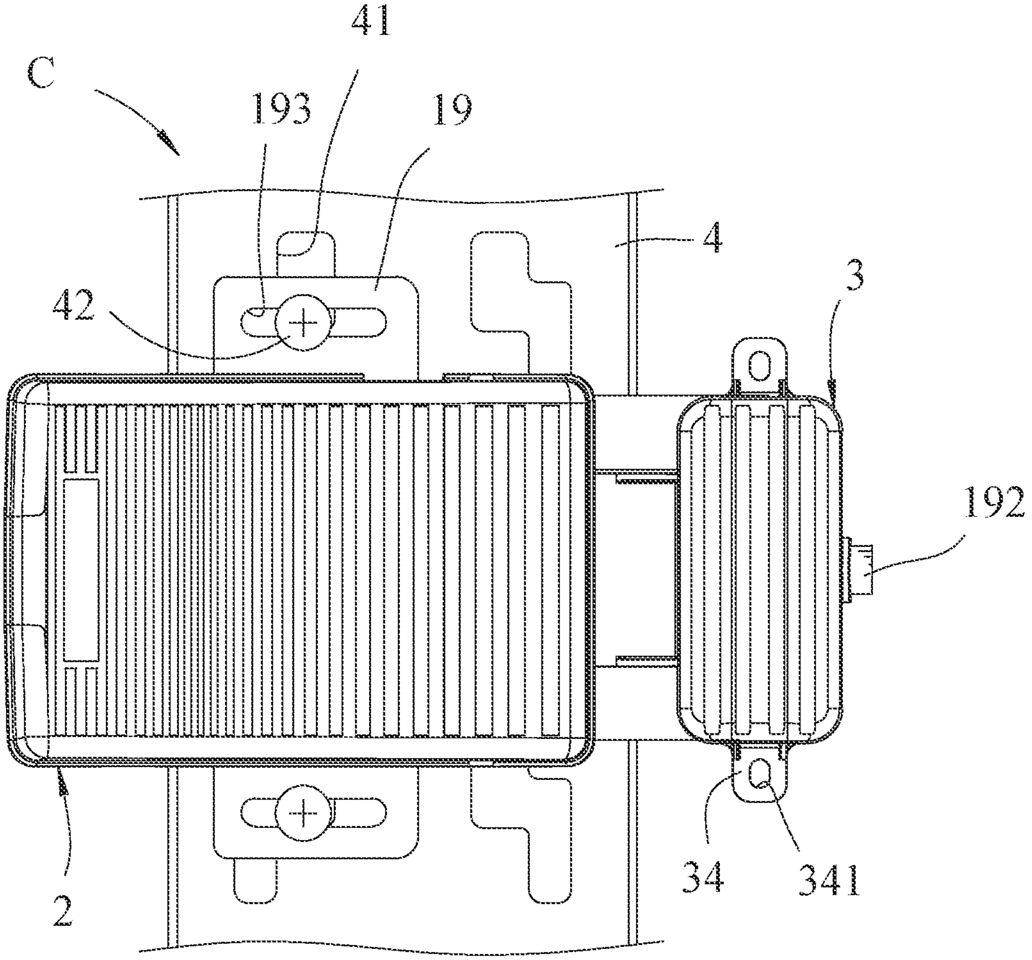
FIG. 9 is a schematic diagram of further another embodiment of the foot pedal switch structure of the present invention.
Figure 10:
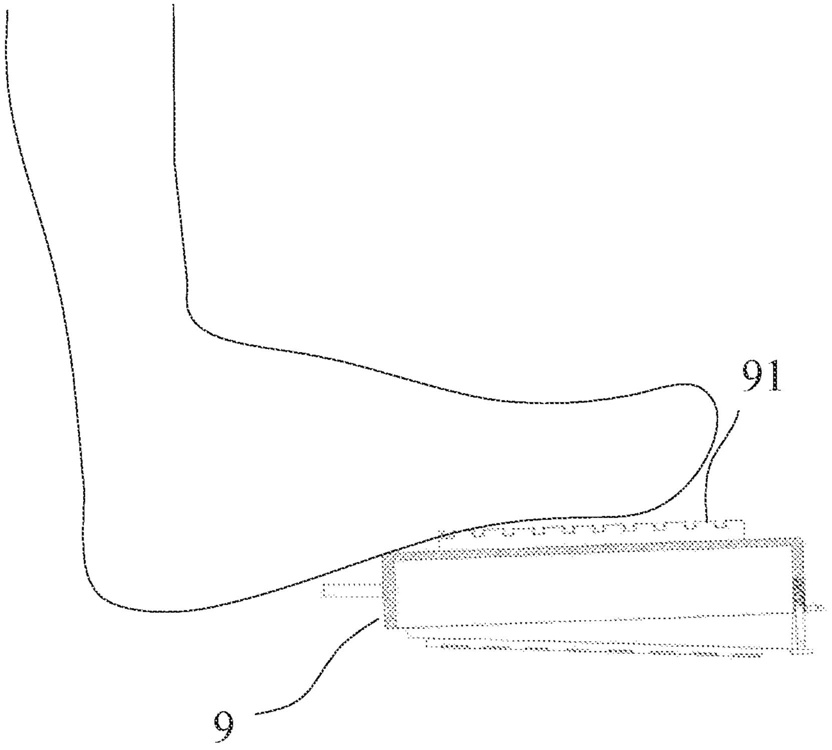
FIG.10 Prior Art
FIG. 10 is a schematic diagram of a foot switch of the prior art.
Figure 11:
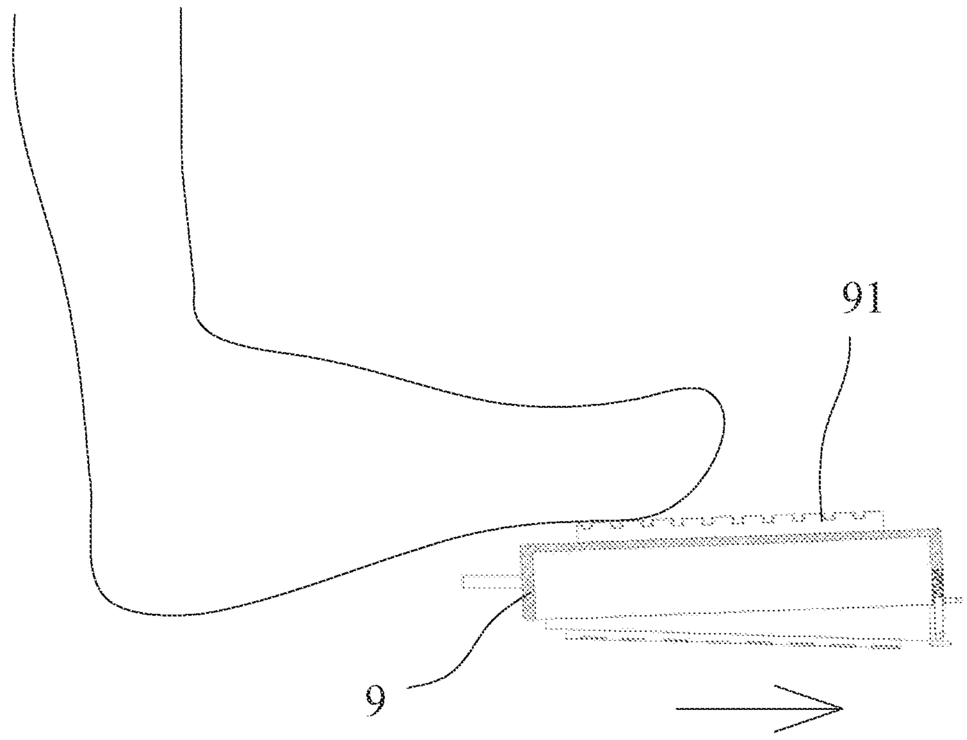
FIG.11 Prior Art

Furthermore, please refer to FIG. 8 and FIG. 9. In further another embodiment of a foot pedal switch structure C of the present invention, the body 1 is connected with the support pad 3 through the joint unit 13. The bent tabs 190 of the retaining base 19 are locked to the body 1, wherein the bent tabs 190 can tightly hold the body 1 and stop the body 1 from moving around. At the same time, the adjusting hole 36 of the support pad 3 is plugged with the positioning plate 191; the adjusting screw 192 passes through the positioning plate 191 and is fastened into the adjusting hole 36. Using the bent tabs 190, the positioning plate 191, and the adjusting screw 192 to secure the body 1 and the support pad 3, that is an integrated whole by a three point fix. The mounting groove 193 of the retaining base 19 is aligned with a plurality of long slot holes 41 of the machine 4 and is fastened to a long slot hole 41 using a plurality of mounting screws 42 therethrough in order to secure the foot pedal switch structure C, so that displacement and restoration of the foot pedal switch structure C will not occur repeatedly after a long period time of operation.

In summary, the present invention relates to a foot pedal switch structure. After searching domestic and foreign publications related to the technology of this type of structure, it is concluded that no identical or similar structures exist in the patents approved prior to the submission of the application of the present invention. Thus, the present invention meets the key requirements for patentability and, therefore, hereby the application is submitted.

The examples described above are a few preferred embodiments of the present invention. Alternative embodiments will become apparent to those skilled in the art to which the present invention described in the patent specification and the appended claims pertains without departing from its spirit and scope.

What is claimed is:

1. A foot pedal switch structure, mainly comprising:

a body having a holding space therein, a pivot shaft respectively located in a rear area of each of left and right outer sides thereof, and a sliding groove located therein, a rear bottom side of the body has a joint unit;

a pedal, wherein the pedal has a pivot hole located in each of left and right sides thereof, the pivot holes are placed over the pivot shafts of the body, the pedal being placed over and covering the holding space of the body;

a support pad, wherein the support pad has a connecting plate extended therefrom the connecting plate is connected with the joint unit of the body;

a control switch disposed in the holding space;

a push-pull device installed in the sliding groove;

a torque spring disposed in the holding space of the body and connected to both the push-pull device and the control switch at the same time; and a spring disposed in the holding space with one end thereof being connected to the body and an opposing end of the spring being connected to the pedal.

2. The foot pedal switch structure as claimed in claim 1, wherein the body has an embedded recess and a mounting piece; the embedded recess is located at a bottom of the body; the mounting piece is lodged in the embedded recess.

3. The foot pedal switch structure as claimed in claim 1, wherein the pedal further comprises a protruding unit and the protruding unit is is disposed in correspondence with the push-pull device of the body.

4. The foot pedal switch structure as claimed in claim 1, wherein the joint unit of the body has a recess unit and the recess unit has a plurality of mounting bosses.

5. The foot pedal switch structure as claimed in claim 4, wherein the connecting plate of the support pad has a plurality of through holes; the plurality of through holes are corresponding to and sleeved on the plurality of mounting bosses located in the recess unit; the connecting plate is fixed onto the mounting bosses of the body through a plurality of screws that rotate through the connecting plate.

6. The foot pedal switch structure as claimed in claim 1, wherein the support pad further includes two flanges respectively disposed on to an outer surface of two opposing sides of the support pad, each of the two flanges have a mounting hole formed therein.

7. The foot pedal switch structure as claimed in claim 1, wherein at least one surface of the pedal has a non-slip unit disposed thereon, at least one surface of the support pad has a non-slip unit disposed thereon, the body has a through hole, the through hole is located on the side of the body, and a power cord passes through the through hole and is electrically connected with the control switch.

8. The foot pedal switch structure as claimed in claim 1, wherein the body has a width and a first length; the ratio of the width and the first length is 4:7; the support pad has a second length; the ratio of the width and the second length is 16:7.

9. The foot pedal switch structure as claimed in claim 1, wherein the body further has a retaining base and an adjusting screw, the retaining base has a bent tab respectively on each of left and right sides thereof, the two bent tabs are respectively locked to both sides of the body, a rear area of the retaining base has a positioning plate, an adjusting screw passes through the positioning plate and is fastened into an adjusting hole of the support pad.

10. A foot pedal switch structure, mainly comprising:

a body having a holding space therein, a pivot shaft respectively located in a rear area of each of left and right outer sides thereof, the rear bottom side of the body has a joint unit, the body further having a retaining base and an adjusting screw, the retaining base having a bent tab respectively on each of left and right sides thereof, the two bent tabs are respectively locked to both sides of the body, wherein a rear area of the retaining base has a positioning plate, and the adjusting screw passes through the positioning plate and is fastened into an adjusting hole of the support pad;

a pedal, wherein the pedal has a pivot hole located in each of left and right sides thereof, the pivot holes are placed over the pivot shafts of the body, the pedal being placed over and covering the holding space of the body; and a support pad, wherein the support pad has a connecting plate extended therefrom, the connecting plate is connected with the joint unit of the body.

* * * * *